United States Patent Office 3,505,609
Patented Apr. 7, 1970

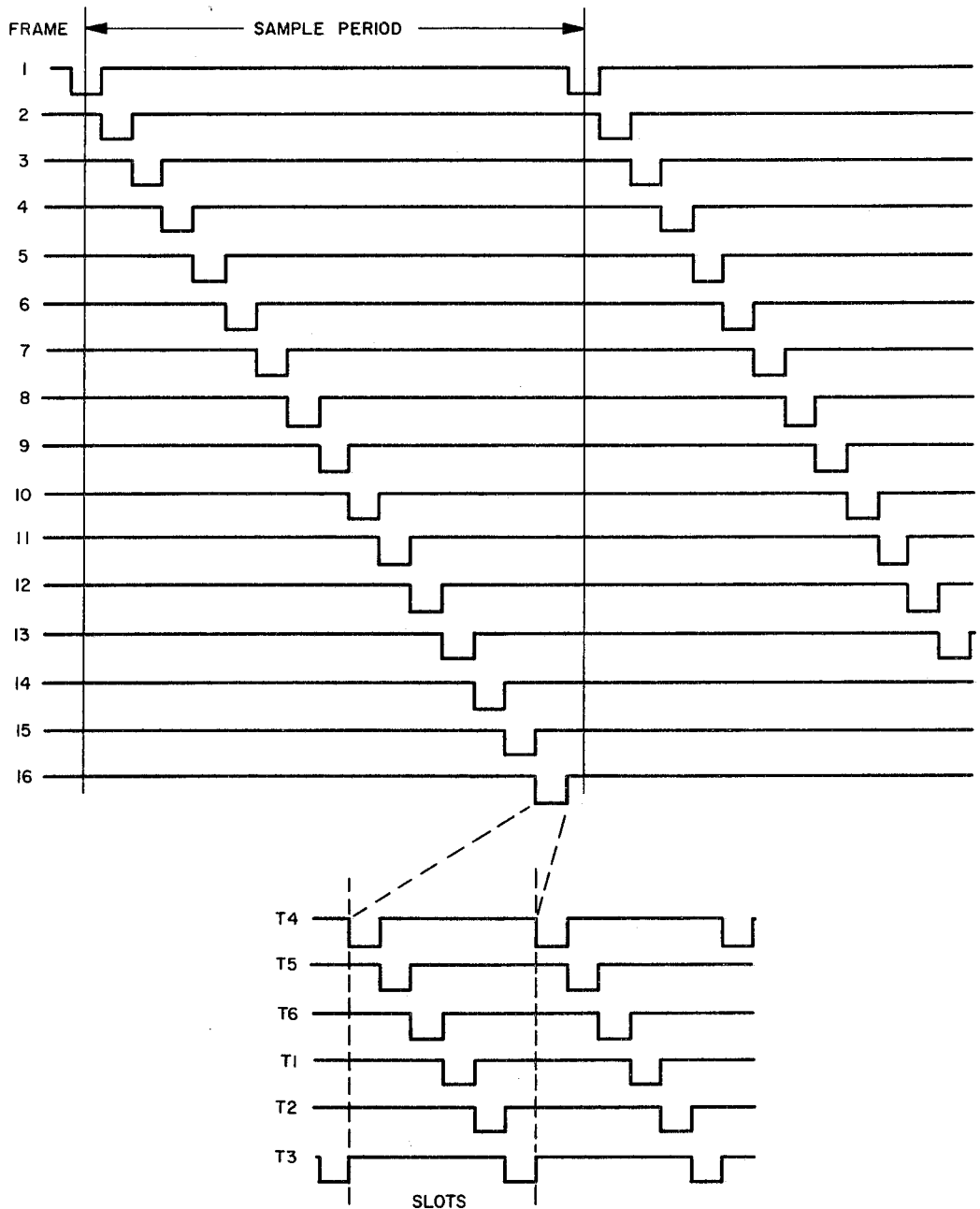

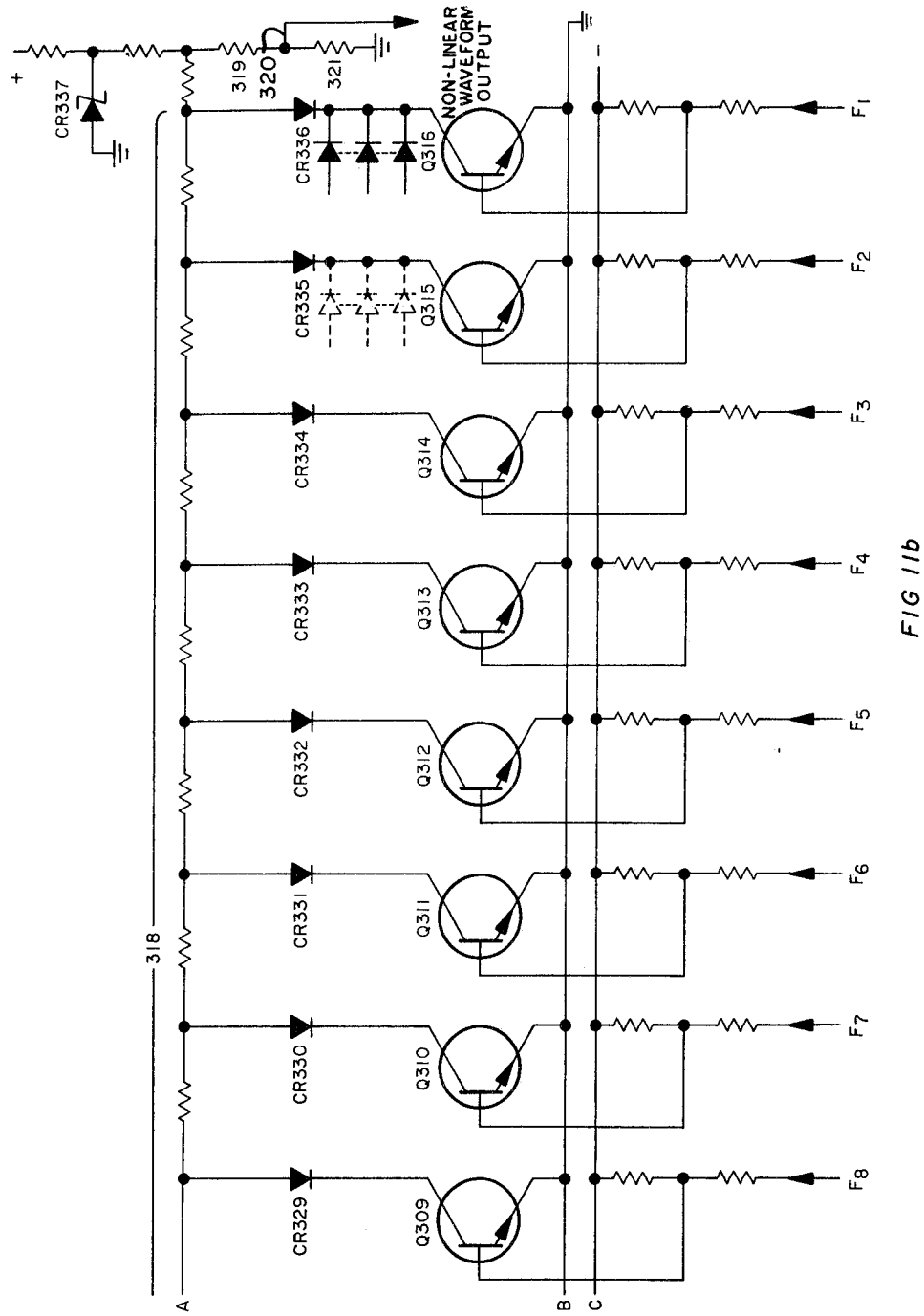

3,505,609
MULTICHANNEL, NONLINEAR PULSE DETECTOR AND DEMODULATOR
Spyros G. Varsos, Maitland, and Richard A. Branham, Orlando, Fla., assignors to Martin-Marietta Corporation, Middle River, Md., a corporation of Maryland
Filed Oct. 11, 1965, Ser. No. 494,677
Int. Cl. H03k 9/04
U.S. Cl. 329—107      16 Claims

ABSTRACT OF THE DISCLOSURE

This invention relates to a device for recreating the intelligence contained in a stream of pulses that have been position modulated, the principle of operation of which device involves the premise that the largest pulse appearing in each of a number of time periods is in each instance the most likely correct pulse. A voltage representative of the position of the largest pulse of each of these periods is derived by the use of a regularly recurring nonlinear waveform. This waveform is not reset except at the end of each time period, with the voltage level corresponding to the position of the most likely correct pulse in each instance being retained until the end of the time period. A succession of readouts of the voltage levels is representative of an expanded version of the originally-transmitted intelligence, the use of the nonlinear waveform making possible the elimination of equipment formerly used in connection with the expansion function.

---

This invention relates to an improved radio pulse detection and demodulation system suitable for use in pulse position modulation radio communications, and more particularly to a detector that advantageously separates intelligence from background noise and crosstalk, in systems where the information-carrying pulse has a higher amplitude than crosstalk and noise pulses. The times of arrival of such higher amplitude pulses are identified with respect to a time reference arrangement, and these times of arrival are translated into a train of pulses regularly spaced in time whose amplitudes are nonlinearly proportional to such arrival times, thus effectively recreating the intelligence contained in the incoming time-position varying pulses and simultaneously performing an expansion operation on the said intelligence.

This invention represents a novel modification of the principles set forth in the Wiggins and Layfield invention entitled "Maximum Likelihood Detector," Patent No. 3,212,014, which is assigned to the assignee of the present invention.

One of the operating principles of pulse communication systems is that if an intelligence signal is sampled at regular intervals, the resulting signal will still retain substantially all of the useful information present in the original signal, provided that the sampling frequency is at a rate equal to at least twice as high as the highest useful frequency in the original signal. In other words, the intelligence may be reproduced substantially in its original form if the sampling period is equal to approximately one-half the period of the highest frequency component of the original wave. This principle is known as the Nyquist sampling theorem. For example, in the case of an audio wave which has been passed through a filter having a cutoff frequency of approximately 3500 cycles, then substantially all of the audio information in the wave is present in a series of samples of the wave taken at a 7.8125 kc. rate which is of course considerably above two times 3.5 kc.

In prior art pulse modulation communication systems, threshold devices have been utilized to detect the presence of a pulse at the receiver. In such systems the threshold devices will indicate the presence of all pulses having energy above the threshold level without regard to the origin of such pulses. Accordingly, pulses due to noise or interference, or crosstalk pulses from other signal channels may accompany the intelligence pulses at the output of the threshold device. Such incorrect decisions in the past have usually been reduced by raising the threshold to a higher level, but unfortunately this procedure increases the number of deletions of correct pulses. These errors, which are known as false alarm and miss errors, respectively, cause distortion and noise in the demodulated signals, thus limiting the usefulness of the pulse communication system. Further, a threshold pulse detector must be followed by a device that serves to convert to an analog amplitude the time of arrival of the pulse with respect to the beginning of the sample.

For an increase of the quality of voice signal transmission, such as when quantization is used, the technique of compression at the transmitter and expansion at the receiver is commonly employed. The unique amplitude distribution patterns of typical voice signals requires this compression-expansion technique in order to transmit the maximum amount of information over a fixed bandwidth channel.

The typical voice signal resembles a waveform containing a large number of small amplitude excursions with few high-amplitude peaks interwoven with them. Thus, at the transmitter the voice waveform is compressed (not clipped) by employing a non-linear function in the process of transforming the audio signal into the quantized PPM signal to be transmitted, and, at the receiver in the demodulation of the PPM signal into the voice signal, the inverse non-linear function is employed so as to restore the original voice signal of the transmitter as faithfully as possible.

According to the present invention, we take a radio frequency signal consisting of intelligence bearing pulses contaminated by noise and interfering crosstalk pulses, identify and extract the intelligence bearing pulses, and perform thereupon the first step in removing intelligence from latter pulses. In so doing, this invention therefore reproduces the transmitted or video signal present at a certain stage of the modulation process in the transmitter.

This process is advantageously accomplished in the present invention by identifying the highest amplitude pulse, which is usually the correct pulse in the presence of noise or spurious pulses. The time of arrival of the correct pulse with respect to a certain period is then identified. This time of arrival is in turn translated into a voltage which is nonlinearly proportional to such time of arrival, which voltages are held from one time reference until the next, at which time the newer such voltage level replaces the previously held voltage level. These time references occur at the beginning of each sample period, such period being determined by the modulation system employed at the transmitter, chosen to satisfy the Nyquist sampling theorem.

The goals of this invention are accomplished by the use of a unique storage concept according to which voltage analogs of the time of arrival of incoming pulses are stored for the duration of a sample period, with a decision being made at the end of this sample period as to which was in fact the correct pulse received during the sample period. This decision is not made on the basis of a threshold, but rather is based upon the previously-mentioned premise that from a comparison of all pulses received during the sample period, the correct pulse can be identified by its higher amplitude. Then at the end of the reference period, a voltage as a non-linear function to such time of arrival is generated and transferred to a readout storage device. After such readout of voltage, the storage device holds this voltage until the end of the next succeeding sample period, at which time a voltage corresponding to the time of arrival of the highest amplitude pulse in this succeeding sample period replaces the previously held voltage. Thus a succession of sample periods will produce an increasing and decreasing staircase type waveform which is a reproduction of the original voice or video signal at the transmitter taken at a particular point in the original modulation process. Appropriate circuitry is then employed to process this staircase-like waveform to reproduce an exact duplicate of the original audio or video signal which occurred at the input of the transmitter.

Numerous important advantages flow as a result of this storage technique, a principal one of these being that the present invention has the unique capability of not being required to make a decision at the instant a pulse is recognized, but rather enables this decision to be deferred until the end of a certain time period, so that the probability can be greatly increased that a correct decision will be made.

This invention advantageously may be employed either in conjunction with a quantized PPM system or a non-quantized PPM system. An inherent feature of this invention is the providing of a timing means which locates the time of arrival of the correct pulse. For continuously varying PPM pulses a continuous time reference can be employed, whereas for quantized PPM pulses, either a continuous time reference or a time reference which changes in discrete time-steps matching the quantization time-steps of the incoming quantized PPM pulses can be employed.

Significantly, the discrete step-type time reference can also be used with a continuous PPM signal when it is necessary or desirable to convert such continuous PPM pulses into quantized PAM signals; such as at the interface of radio relay systems where the incoming signal is nonquantized and the outgoing signal is to be quantized.

Our invention finds special application with a unique, recently developed pulse-type signalling system utilizing the tropospheric scatter medium in which a multiple time-frequency coding scheme is used to implement a time-division multiplexing method. Such is the patent application of Goode & Wiggins entitled "Tropospheric Scatter Communication System Having High Diversity Gain," filed Apr. 12, 1962, Ser. No. 186,912, which is now Patent No. 3,226,644, assigned to the assignee of the present invention. In that invention, hereinafter known as the TROPO system, each signal pulse is divided into five subpulses wherein each subpulse is transmitted by means of a different time slot-frequency combination. In order to obtain a maximum system loading, the multiplex channels share a maximum of one time-frequency combination between any pair of such multiplex channels. The pulse stream from the receiver decoder summer will consist of the correct pulse composed of the sum of the five subpulses occurring at the times corresponding to the PPM process at the transmitter and randomly-occurring crosstalk pulses from random combinations of subpulses from other multiplex channels. The probability is very high that the random combinations of such subpulses plus noise energy will be of a lesser amplitude than the coherent combination of the correct subpulses. The present invention makes possible the practical application of such a pulse-type communication or signalling system by reducing to a negligible value the errors and voice-distortion due to such crosstalk.

Accordingly, it is an object of this invention to provide a demodulator of an improved type, using a single nonlinear waveform generator for a plurality of channels, and adapted to be utilized in a pulse position modulation radio system for detecting the transmitted pulse in a time interval containing noise and interfering crosstalk pulses, and for identifying the time of arrival of such transmitted pulse with reference to the beginning of the time period representing a sampling period of the original audio or video signal.

Another object of this invention is to provide a device for producing an output signal which is a succession of voltage levels whose amplitudes are a nonlinear function of the time of arrival of the correct transmitted pulses with reference to the beginning of the time period which represents a sampling period of the original audio or video signal; such output signal being a reconstruction of the original audio or video signal.

Yet another object of this invention is to provide a demodulator which will advantageously combine the expansion principle with the demodulation process, so as to eliminate the need of additional equipment for expanding after the demodulation.

Still another object of this invention is to provide a device making use of analog buffer storage techniques, which device will enable in a radio frequency pulse communication system the use of multiplexing methods which achieve higher density of separate channels in a given spectrum bandwidth than heretofore possible, this high density being achieved by dividing the basic pulses into subpulses and allowing overlapping or sharing of subpulses between such separate channels, wherein crosstalk pulses arising from this sharing are of smaller energy or amplitude than the correct channel pulse.

As previously mentioned, the present invention is a novel modification of the above-cited Maximum Likelihood Detector patent of Macdonald J. Wiggins and Lowdy Clifton Layfield, the present invention differing by advantageously employing only a single nonlinear waveform generator for all channels of a multichannel system. This is made possible by employing the aforementioned unique buffer storage technique that enables the particular voltage level of the staircase to be retained until the end of each sample period. This particular voltage level corresponds to the level associated with that time frame of the period that the largest pulse was detected. Such values at the end of each sample period are the voltage analogs of the received pulse position modulation, and these are impressed upon suitable audio filters to recover the audible portion of these voltage analogs.

In accordance with the present invention, a logarithmic staircase wave is employed in lieu of the former linear staircase, this being done in order to compensate for the compression employed at the transmitter. It should be noted that the transmitter is deliberately designed with compression circuits in order to prevent over-modulation and to utilize the full information bandwidth of the transmitter. As a bonus, the nonlinear waveform generator performs a desirable amount of expansion function that formerly required additional circuitry immediately following the earlier Maximum Likelihood Detector.

These and other objects, features and advantages will be apparent from a study of the enclosed drawings in which:

FIGURE 10 is a series of waveforms utilized in conjunction with the detailed explanation of our invention;

FIGURES 11a and 11b are related schematic diagrams of our Nonlinear Waveform Generator;

Figure 1:
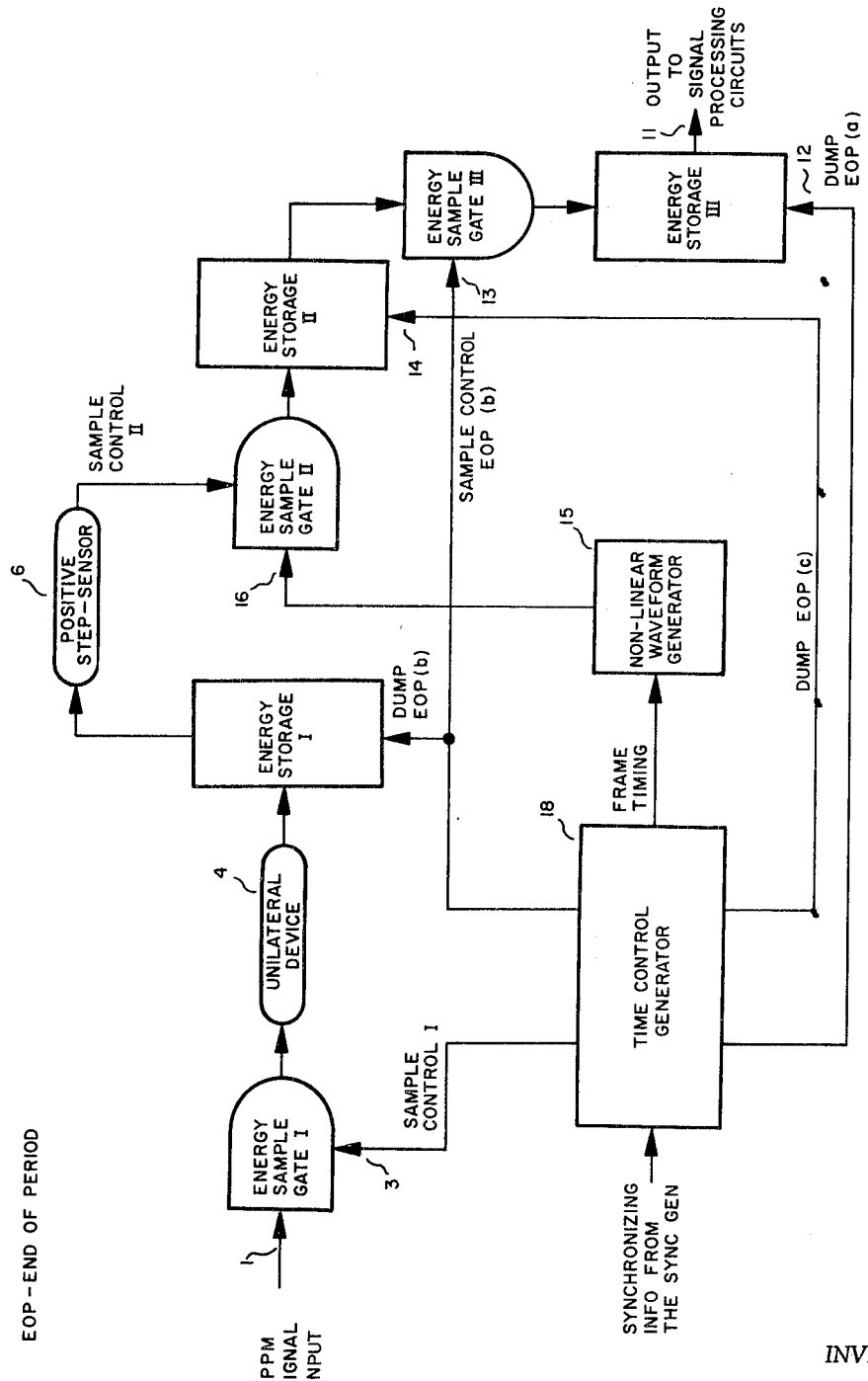
FIGURE 1 is an exemplary block diagram of our improved demodulator, which will be utilized for the explanation of the basic principles of this invention.

Referring to FIGURE 1, the block diagram of a single channel nonlinear pulse detector and demodulator is there illustrated, which is arranged to receive at its input a PPM signal, and to supply at its output a continuous-type waveform which becomes the audio or video signal after the proper filtering.

The Energy Sample Gate I receives the incoming PPM signal on Lead 1, and receives on Lead 3 the Sample Control I signal from the Time Control Generator 18. This latter signal provides the timing information so that the input signal will be sampled at the optimum time at which point the input signal is expected to be at its highest level during that particular sampling frame. For example, the time period may be divided into sixteen frames, and at the end of each frame, the voltage level representing the maximum pulse amplitude reached during that frame is sampled, as will be described hereinafter.

Figure 2:
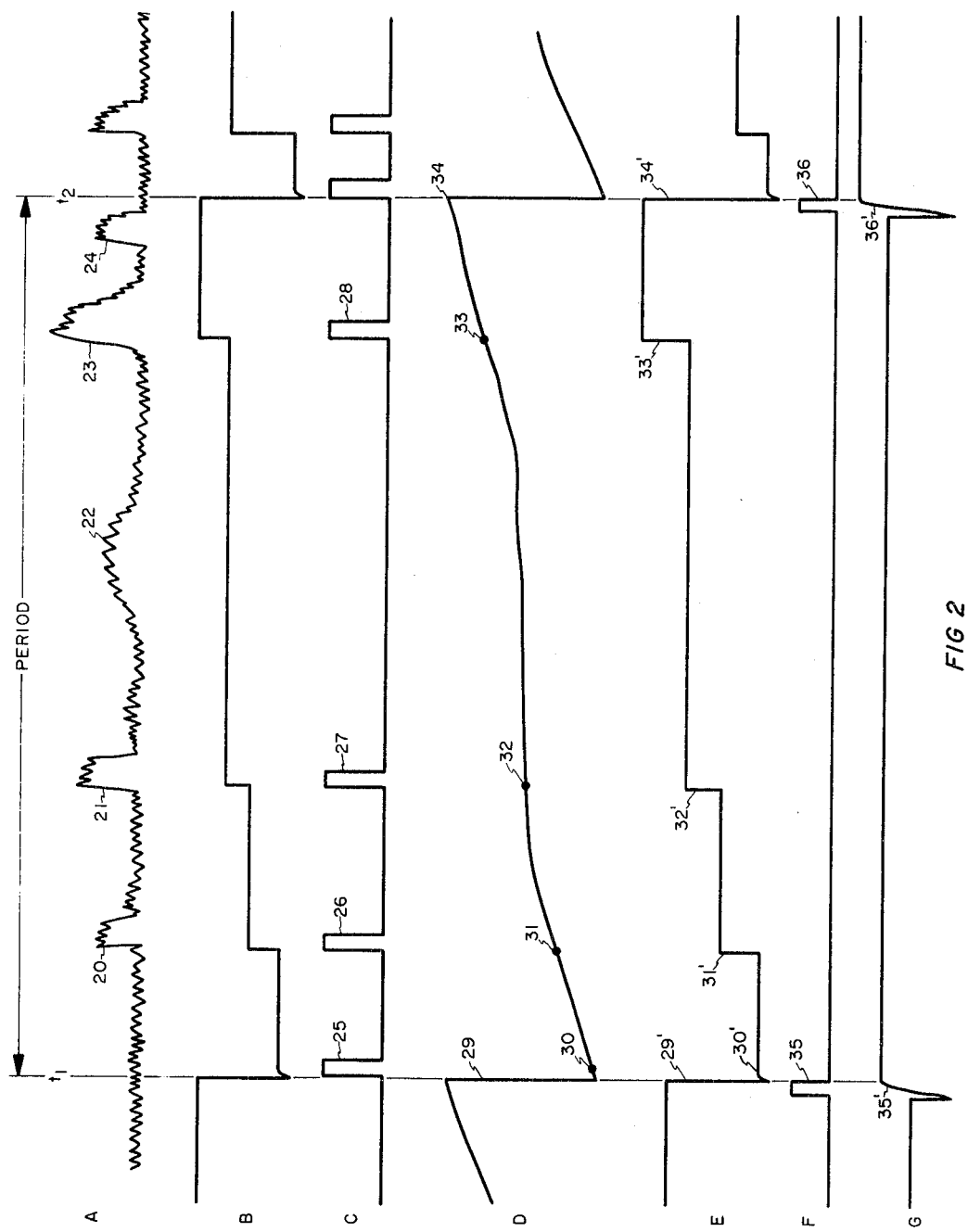
FIGURE 2 is a waveform diagram setting forth on an expanded time scale the key waveforms used in the explanation of FIGURE 1.

The output from Energy Sample Gate I is delivered to a Unilateral Device 4, which output is a waveform of the type depicted in Line A of FIGURE 2. The Unilateral Device 4 is arranged to pass only positive-going signals, and while a diode is admirably suited for this purpose, it is within the spirit of this invention to use any two terminal unilateral device which will conduct with low signal attenuation, with a positive voltage gradient across its terminals, and which will not conduct when a negative voltage gradient is across its terminals.

The output of Unilateral Device 4 is delivered to Energy Storage I, and the energy stored in latter device increases only when the pulse voltage amplitude is greater than the voltage in the storage circuit by virtue of the fact that otherwise a negative voltage gradient across the terminals of the unilateral device is present. From Energy Storage I, information indicative of voltage level changes is fed to Positive Step Sensor 6.

Referring in more detail to FIGURE 2, this illustration reveals a sample period from $t_1$ to $t_2$, which for example is 128 microseconds duration if the sample frequency is chosen to be 7.8125 kc. As a result of the arrival of pulse 20 in Line A, the voltage level in Energy Storage I steps at a time corresponding to the leading edge of pulse 20 to a higher value, as indicated in the corresponding portion of Line B. Subsequently-arriving higher pulses cause further step ups of the waveform of Line B, which values are fed to Positive Step Sensor 6, previously mentioned. This latter device is arranged to produce impulses as shown in Line C of FIGURE 2, which of course correspond to the step-up transitions of the waveform depicted thereabove.

As will of course be noted from a study of FIGURE 2, successive incoming pulses of Line A occurring within sample period $t_1$–$t_2$ bring about upward steps in the Energy Storage I if and only if the successive pulse is of greater amplitude than any previous pulse arriving in that time period. As will be observed, pulses 20, 21 and 23 cause corresponding increase in the voltage level stored in Energy Storage I, for these pulses are each successively larger than the largest of their predecessors. In contrast, pulses 22 and 24 do not alter the contents of Energy Storage I inasmuch as they each are of less amplitude than their predecessors.

The output pulses of Positive Step Sensor 6 are used for providing the timing information (Sample Control II pulses) for the Energy Sample Gate II depicted in FIGURE 1. These pulses sample the amplitude level of the waveform appearing on line 16 from Nonlinear Waveform Generator 15, such latter waveform being a regularly recurring nonlinear waveform of the type shown in Line D of FIGURE 2, extending between $t_1$ and $t_2$.

As may be apparent, the Nonlinear Waveform Generator 15 in accordance with this invention is provided to translate incoming PPM pulses into amplitude modulated pulses, and because this device is deliberately constructed to provide a nonlinear waveform of the type illustrated, it serves the herein-desired purpose of providing the expansion function for faithfully reproducing the waveform that was transmitted.

The particular levels of waveform D sampled by pulses 25, 26, 27 and 28 of Line C are shown by points 30, 31, 32 and 33 of Line D, which are of course at successively higher levels above a datum plane since the time of arrival of the pulse is accordingly translated into an amplitude level. Through the Energy Sample Gate II the sampled levels are transferred to and stored in Energy Storage II, which also may be regarded as an Analog Buffer Storage. These sampled levels appear at the output of Energy Storage II in a built-up successive fashion as depicted by Line E of FIGURE 2. The amplitude level that is found stored at the Energy Storage II at the end of a sampling period corresponds to the time of arrival of the highest pulse received within that period. The final level 33' is delivered in accordance with this invention to the input of Energy Sample Gate III when this gate is sampled (EOP(b) in FIGURE 1), and transferred to Energy Storage III. The output 11 of Energy Storage III contains the sampled data, from which the subsequent filtering aid processing circuits (not shown in FIGURE 1) will reconstitute the original transmitted waveform.

The sampling of the contents of Energy Storage II and transfer to Energy Storage III takes place as a result of the arrival of a delayed version of pulse 36 on line 13 at the end of a sampling period. Pulse 36, as well as preceding pulse 35, is shown on Line F of FIGURE 2, and occurs 128 microseconds apart in accordance with the sample period assumed herein for the purpose of explanation.

Time Control Generator 18 is an important part of the present demodulator of a receiver in that it provides synchronization information that brings about the endings of time periods as well as sub-period timing information such as individual pulse or frame synchronization. Output lines 12, 13 and 14 of Generator 18 are provided so as to indicate to various gates and storage elements the end of each period. Line 12 carries to Energy Storage III a dump pulse EOP (a), an undelayed version of the end of a period pulse 36, whereas line 13 carries a slightly delayed version of the same information, EOP (b), to Energy Storage I and Sample Gate III. This delay is provided so that the pulse appearing on line 12 will have a chance to cause the clearing of Energy Storage III before the arrival of any new information. Similarly, the dumping pulses arriving on line 14 are delayed from those of line 13 so that Energy Storage II is not dumped before it delivers its contents to Energy Storage III at the end of the period.

Energy Storage III of course holds each level that it receives for one full period, and then just before the next level arrives, it returns to the zero reference level per the dump pulse 36 on line 12. The waveform appearing on lead 11 at the output of Energy Storage III is shown in Line G of FIGURE 2 and this level, determined by the level 33', becomes the reconstituted signal after it is properly processed through a low pass filter of subsequent circuitry, in which the required gain is present.

As thus should now be seen, Timing Control Generator 18 providing the necessary timing pulses and the Nonlinear Waveform Generator 15 are circuits serving a large function in the demodulating, decoding and expanding processes, which generators, significantly, can be shared in a multichannel operation.

Figure 3A:
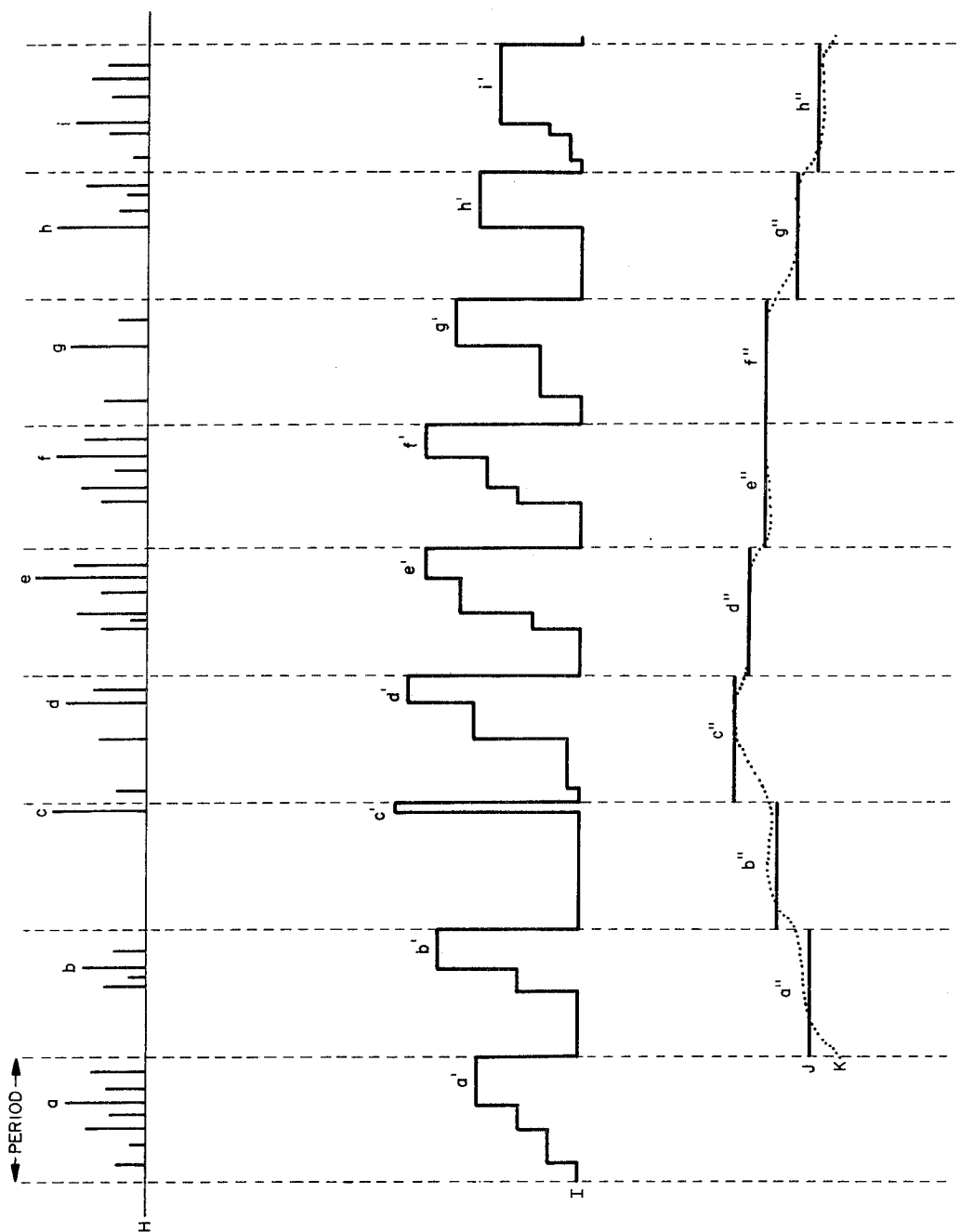
FIGURES 3a and 3b are related waveform diagrams showing by the use of a condensed time scale the operation of our device over a number of successive sample periods.
Figure 3B:
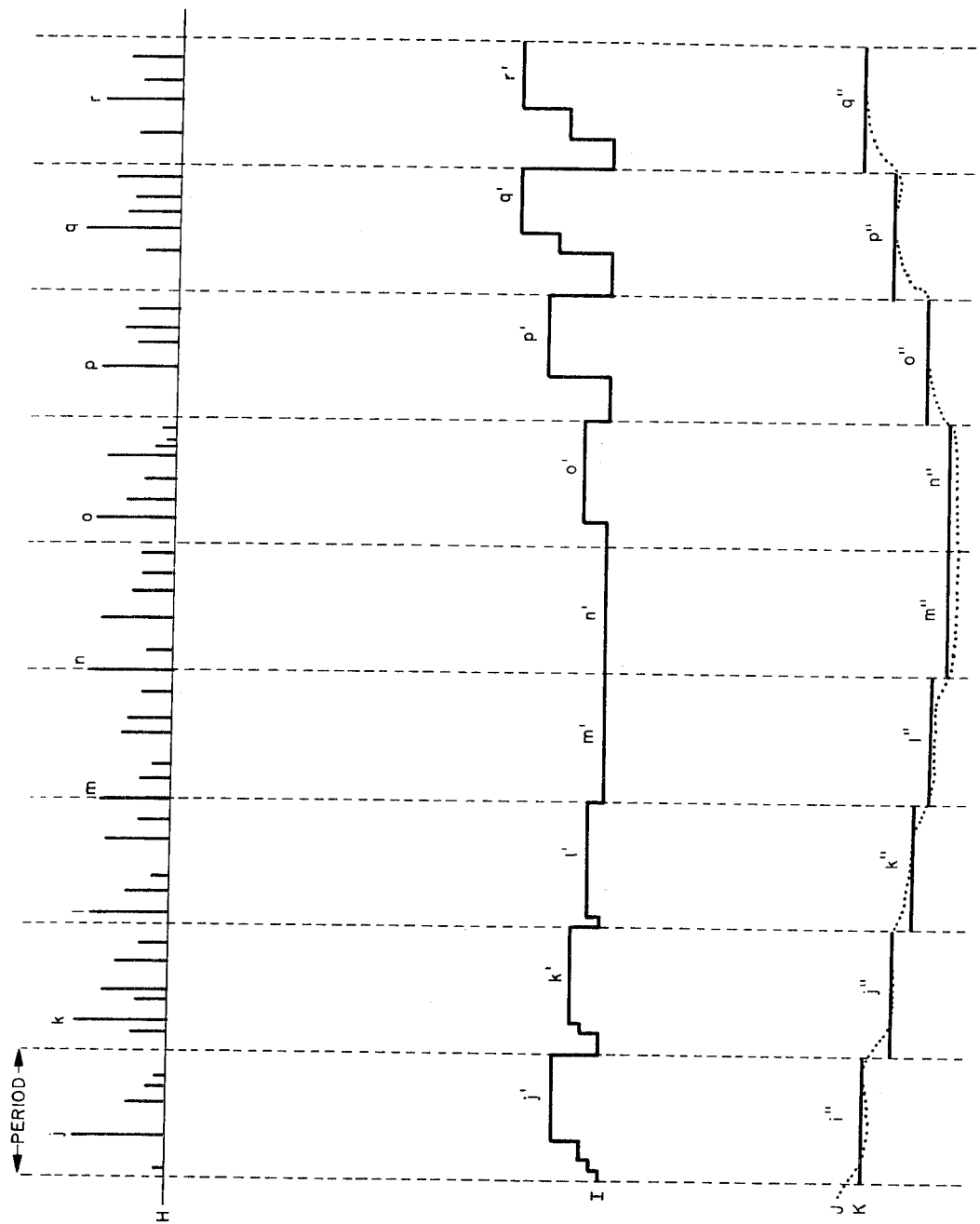

Turning to interrelated FIGURES 3a and 3b, Line H represents a succession of continuous sample periods, each of these sample periods being of a time duration equal to the time period $t_1-t_2$ shown in FIGURE 2. In the 18 sample periods shown, the pulses illustrated have amplitudes proportional to the voltage level or energy in various pulses entering the system. The pulses numbered from $a$ to $r$ are the "correct" pulses and have the highest amplitude in each 128 microseconds sample period. All other pulses are interfering or crosstalk pulses. These crosstalk pulses have very high probability of being of lesser amplitude than the desired pulses in certain applications for which this invention is useful.

Line I of FIGURES 3a and 3b shows the waveform at the output of the Energy Storage II, and it should be noted that each step-up occurs at the time of arrival of each successively larger pulse in a sample period, and that it returns to zero reference at the end of each sample period. The levels $a'$ to $r'$ thus represent by means of voltage level the time of arrival of the corresponding pulses $a$ through $r$ on Line H.

At the end of each 128 microsecond period, the levels $a'$ through $r'$ on Line I are transferred to Energy Storage III, FIGURE 1, and as depicted on Line J, the Energy Storage III maintains these levels at its output line 11, FIGURE 2, which are indicated by $a''$ through $r''$ through each succeeding sample period. As will be obvious to those skilled in the art, this succession of held levels shown on Line J is thus a reconstitution of the original sampled PPM audio or video signal. This waveform is then passed through a low pass filter which removes the high frequency components generated in the sampling process, thus yielding the smooth audio wave shown on Line K, which represents the original audio or video signal.

It is noted that this invention will reconstruct the sampled audio or video waveform present at the transmitter prior to the pulse position modulation operation where the pulses arriving at the input of this invention are contaminated by noise and interfering crosstalk pulses which is a situation occurring in certain useful applications of this invention. There is no intention to limit the usefulness of this invention to such applications, however, for the invention is unique and useful for pulse position demodulation in any PPM system regardless of the presence of noise or interference.

Figure 4:
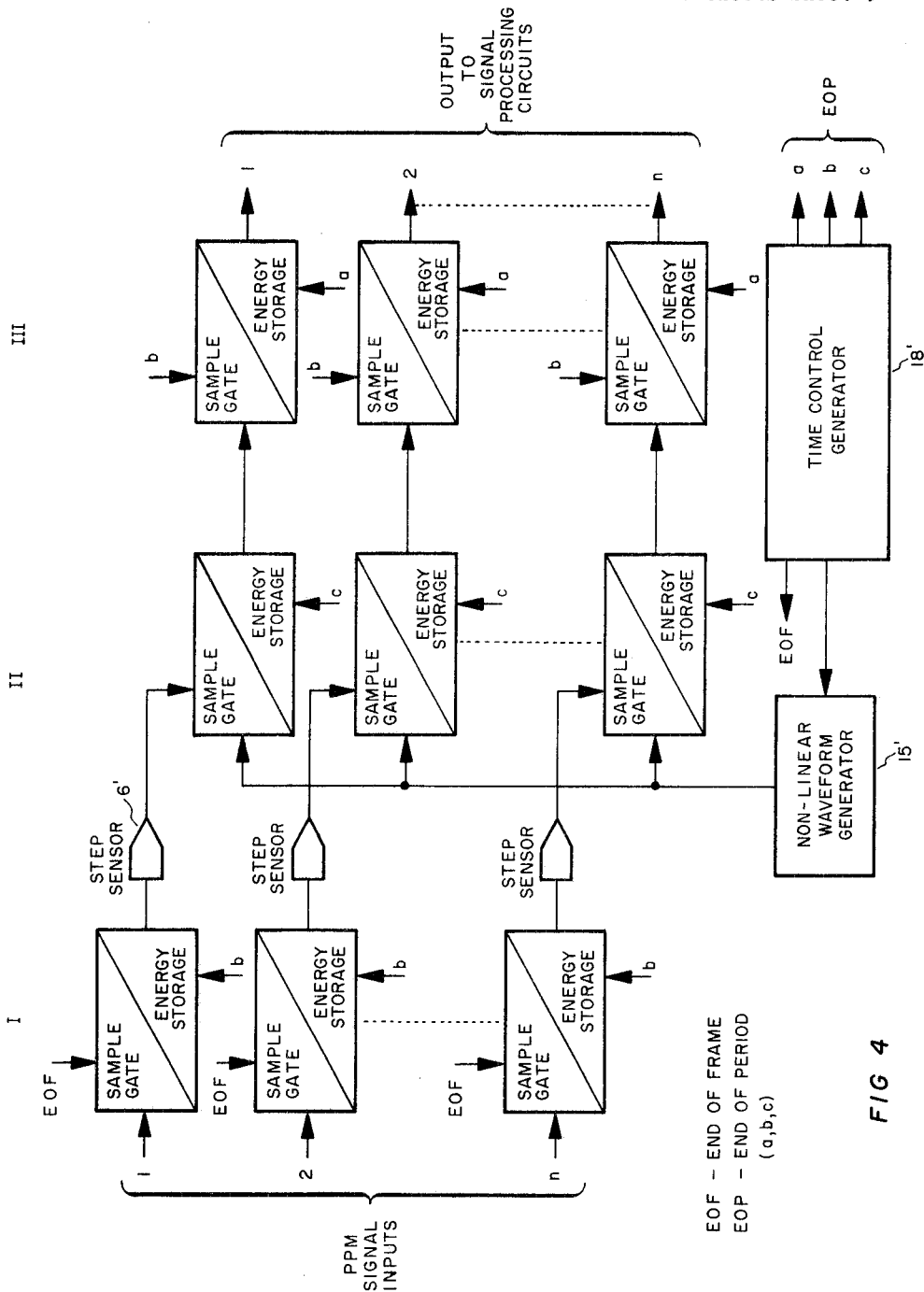
FIGURE 4 is a block diagram illustrating how in accordance with our invention a single Nonlinear Waveform Generator can be effectively utilized for a number of communication channels of a point to point communication system.

FIGURE 4 represents a multichannel version of our invention, in which the Nonlinear Waveform Generator 15' advantageously supplies the nonlinear demodulation wave to a number of Energy Storage II circuits. As shown in this figure, there may be say $n$ channels, and for convenience the Energy Storage II circuits connected to the generator 15' are depicted under the designation "II" appearing at the top center of FIGURE 4.

The sharing of a single Nonlinear Waveform Generator in a multichannel system is one of the important features of our invention, for considerable reduction in the overall system complexity is immediately available. The unique analog buffer storage technique represented by Energy Storage II makes possible the use of the single waveform reference for all channels of the $n$ channel system.

From basic similarities to the single channel embodiment of FIGURE 1, and the letter designations on FIGURE 4, it will be seen that appropriate End of Period pulses from Time Control Generator 18' are delivered to the Energy Storage devices I, II and III in proper sequence. Also, End of Frame pulses are delivered from generator 18' to the Sample Gates I of the various channels.

Figure 5:
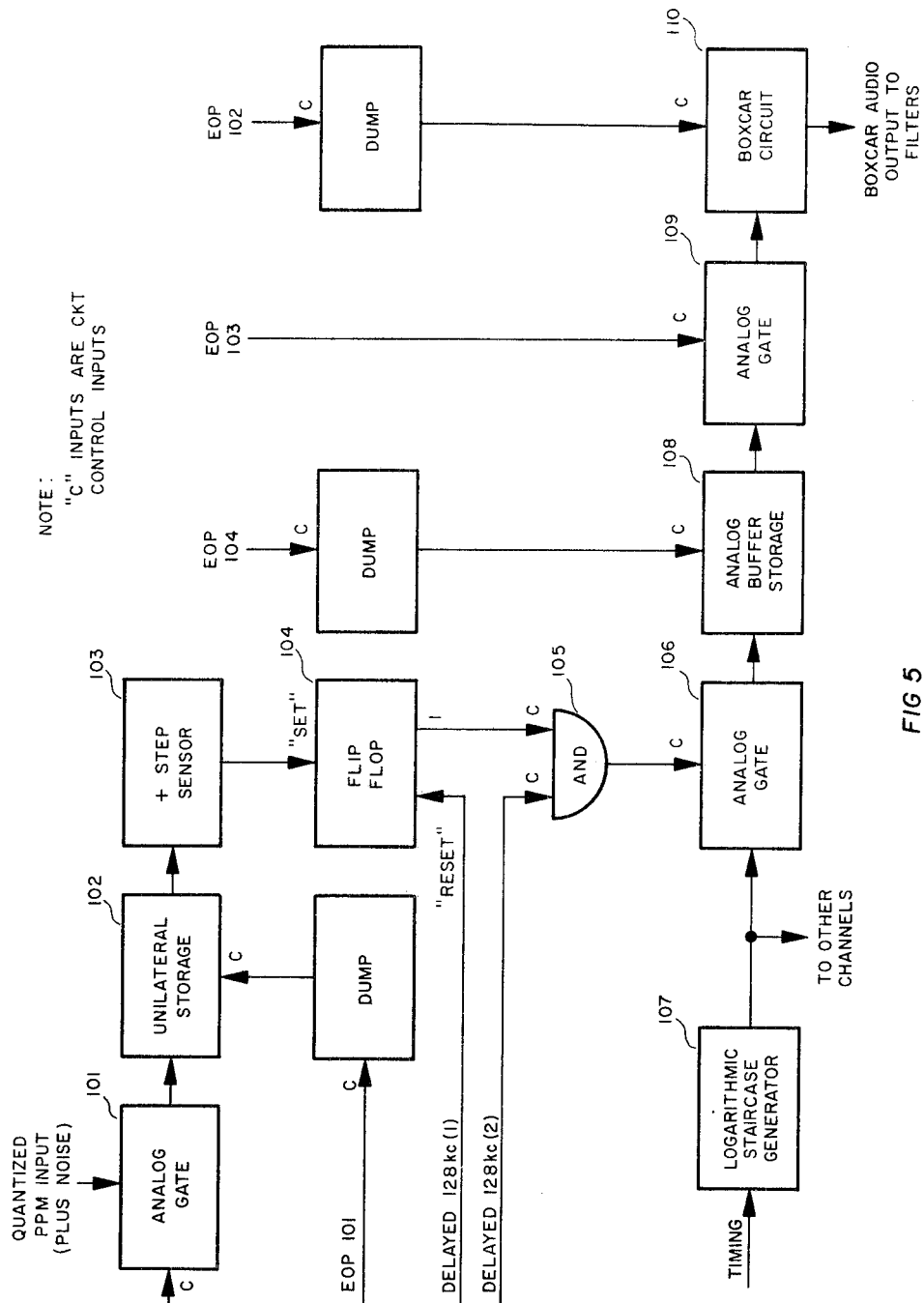
FIGURE 5 is a block diagram of a preferred implementation of our invention.

Referring to FIGURE 5, a block diagram is presented which represents a preferred implementation of our invention. This circuit has the major functions of converting Pulse Position Modulated signals into amplitude samples and ultimately into audio, and simultaneously expanding the amplitude samples to compensate for preprocessing of the transmitted signal. The particular design is digital in concept and is compatible with the hereinbefore mentioned TROPO comunication system.

This embodiment of our invention will simultaneously demodulate and expand special PPM signals in the presence of noise. Special PPM signals refer to the TROPO signal format which is instantaneously compressed in amplitude and quantized into discrete time increments at the transmitter; thus the signal to be demodulated is a compressed and quantized PPM. Our invention, sometimes called the Charge and Transfer Maximum Likelihood Detector (C & T MLD), changes the compressed and quantized PPM input signal into expanded and quantized amplitude samples. The amplitude samples are filtered by conventional filter circuits to recover the audio portion of the C & T MLD output. The C & T MLD presented herein used sixteen discrete levels of quantized decoding, which are approximately the inverse of quantized encoding at the transmitter.

This embodiment is economical from a cost and space point of view; for along the lines of the preceding discussion, this embodiment requires only one Nonlinear Waveform Generator, which is shared by all channels of a multichannel system.

As shown in FIGURE 5, a quantized PPM input signal input signal passes through the Analog Gate 101, which is synchronously opened by the 128 kc. timing input. Other circuits in a system such as the TROPO system maintain the phase relationship of the quantized PPM and the 128 kc. gate. The gated PPM enters a unilateral storage device 102 which holds the maximum signal amplitude encountered throughout the sample period. Since the most likely correct signal is also the highest pulse, it follows that time-of-occurrence of the last positive excursion of the Unilateral Storage circuit 102 in a given sample period also coincides with the receipt of the highest pulse in that sample period. The remaining circuitry of this figure, therefore, performs the function of changing time-of-occurrence of the last positive excursion of the Unilateral Storage 102 into an output voltage sample which is an analog of the time of occurrence of the highest PPM pulse input.

A sensing circuit 103 that detects even a very small positive excursion is employed to "set" a Flip Flop 104 every time a plus step occurs. Four microseconds after each "set," "AND" gate 105 is opened by the "Delayed 128 kc. (2)" (see line N in FIGURE 6), which in turn opens analog gate 106. During the time that the analog gate 106 is opened, the voltage value of Logarithmic Staircase Generator 107 is transferred into Analog Buffer Storage 108. In the meanwhile the Flip Flop 104 is re-set by the "Delayed 128 kc. (1)" (see M FIGURE 6) to ready it for another possible "set." At the end of each sample period, it is apparent to those skilled in the art that the value of voltage in Analog Buffer Storage 108 is an analog of the time of arrival of the highest pulse received during the sample period. This statement is evident from the fact that the Logarithmic Staircase waveform (see R FIGURE 6) which is monotonically increasing throughout the sample period represents the voltage analog of all pulse positions. The highest pulse (assumed correct) causes the last gating of the logarithmic staircase sample into Analog Buffer storage 108. Hence the last value in Analog Buffer Storage 108 is then the voltage analog of the time of occurrence of the correct pulse.

It is the function of Analog gate 109 to transfer the voltage level in Analog Buffer Storage 108 into the Boxcar Circuit 110 at the end of the sample period. Boxcar Circuit 110 is used to hold the transferred voltage level from one sample period to the next. The output of the Boxcar Circuit 110 is a succession of voltage analogs of the times of arrival of the correct pulses which were received during the previous sample periods.

The Flip Flop 104 may be set many times by noise and cross-talk pulses during a sample period. The important thing is that the most likely correct pulse is also the highest amplitude pulse, and hence the voltage analog of the position of that pulse which should be used to impress an output amplitude sample to the audio filters and circuits. Also, it logically follows as previously mentioned that the highest pulse is also the pulse that causes the last input into Analog Buffer Storage 108. Hence, the voltage in Analog Buffer Storage 108 at the end of the sample period is the analog of the input PPM sample. The remaining circuitry, therefore, will function to impress this voltage value which is in Buffer Storage on the audio circuits.

Figure 6:
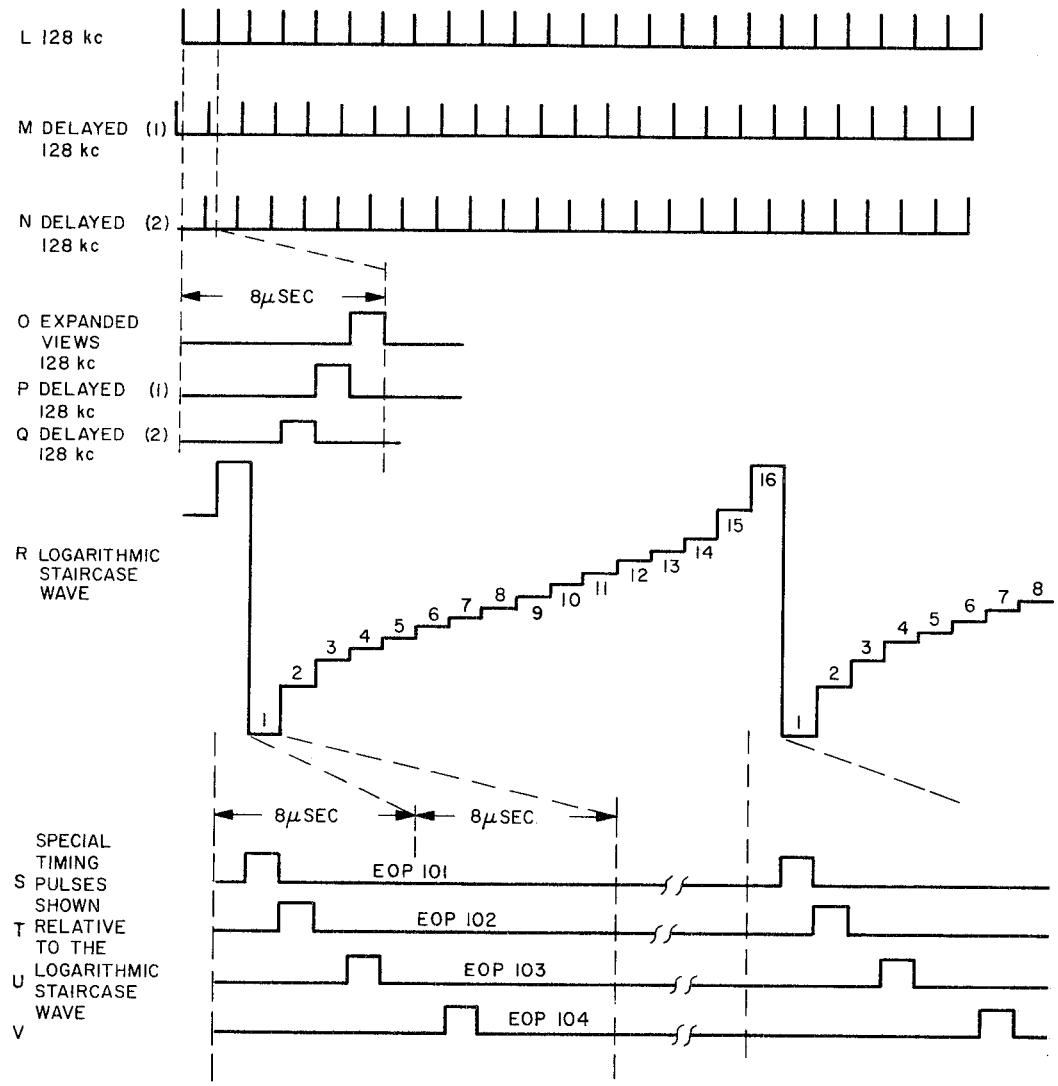
FIGURE 6 is a waveform diagram relatable to FIGURE 5.

Referring in greater detail to FIGURE 6, the timing waveforms are shown. Their purposes are to initiate a sequence of events which leads to the impressing of a voltage sample on the audio circuits once per sample period and to reset the entire circuit to prepare it for the next sample period. The special timing pulses, End of Period (EOP) 101 through 104, accomplish the desired result. With reference to FIGURE 5, the End of Period operation is as follows: Since at the end of the sample period, the Unilateral Storage 102 is the first circuit to fulfill its mission, it is logically the first one to be dumped by EOP 101. The next step is to dump the previous sample from the Box Car Circuit 110. This is done by EOP 102, although it could also be done concurrently with EOP 101. The pulse EOP 103 then opens the analog gate 109 and charges the Box Car Circuit to the value in Buffer Storage 108. Finally, the voltage value in Buffer Storage, no longer needed, is dumped by EOP 104. The circuit is now ready for the next sample period. The Box Car Circuit 110 is used to hold the sample on the audio circuits for the remainder of the next sample period, at which time it will be dumped to make way for the next audio sample.

The Logarithmic Staircase Generator 107 actually performs the expansion operation by the nature of its waveshape, which is depicted on line R in FIGURE 6. If it were linear, there would be no expansion. Each level of the staircase is in reality a reference voltage to which the PPM is demodulated, hence a logarithmic expansion requires a logarithmic shape. It is also important to note that only one Logarithmic Staircase Generator 107 is required for a multichannel system using the same sample periods in each channel, which feature results in considerable cost savings in multichannel systems.

Figure 7:
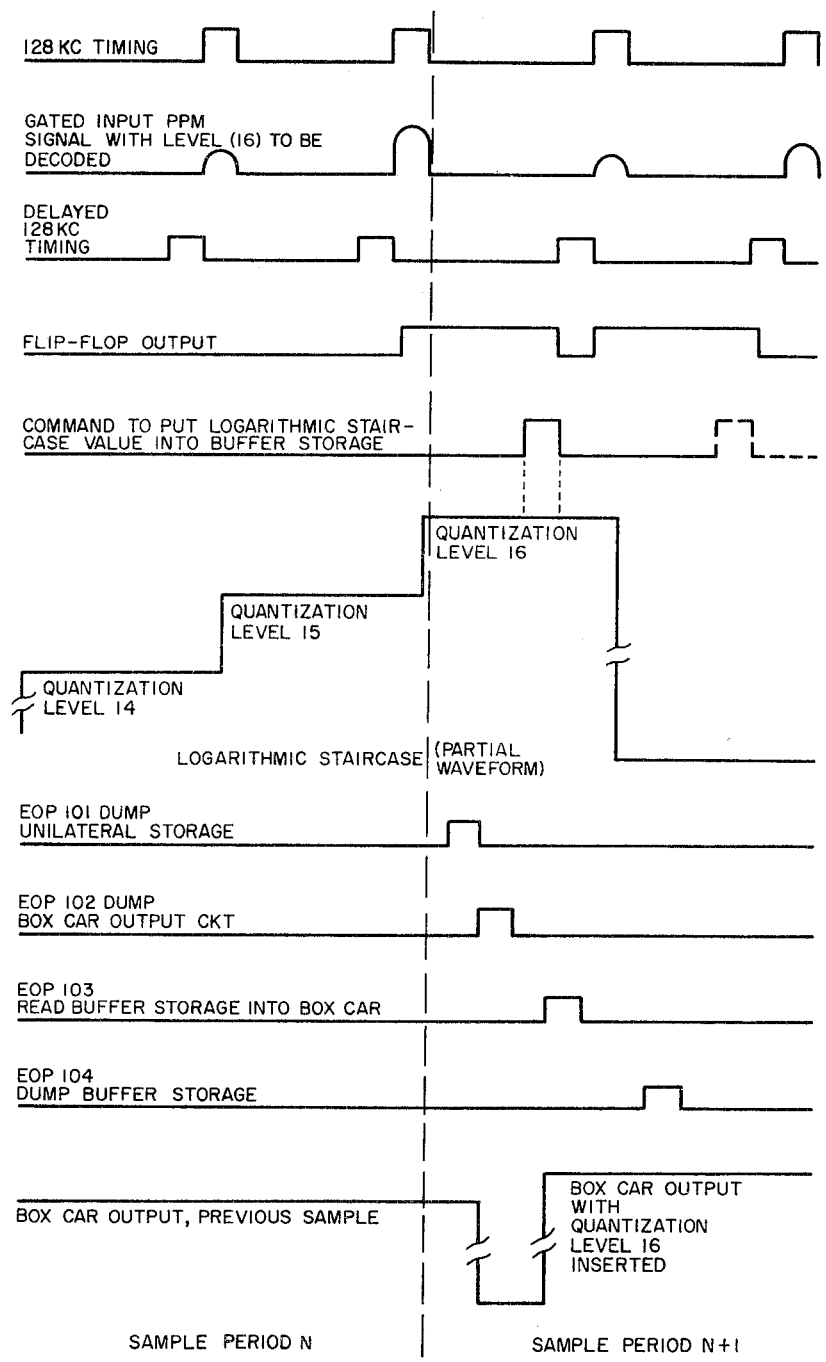
FIGURE 7 is a detailed waveform diagram of the demodulation of quantization level 16.

Referring to FIGURE 7, the timing sequence is shown for demodulating a level 16. Note that the Box Car output is shown to indicate level 16 in the subsequent sample period to the one in which the sample occurred. This one sample period delay is true for all levels. Note also that the Logarithmic Staircase is 8 microseconds out of phase with the sample period, evidenced by "Quantization Level 16" being located in Sample Period N+1. This phase relationship was one of convenience so that the system would fit the existing TROPO system in a manner that would require no major system modifications. The choice of timing pulses was also a matter of convenience to fit the TROPO system. Though the TROPO invention requires only three pulses necessary at the End of Period, four pulses were used herein so as to make the circuit once again compatible with the timing pulses which were already available in the TROPO system.

Figure 8:
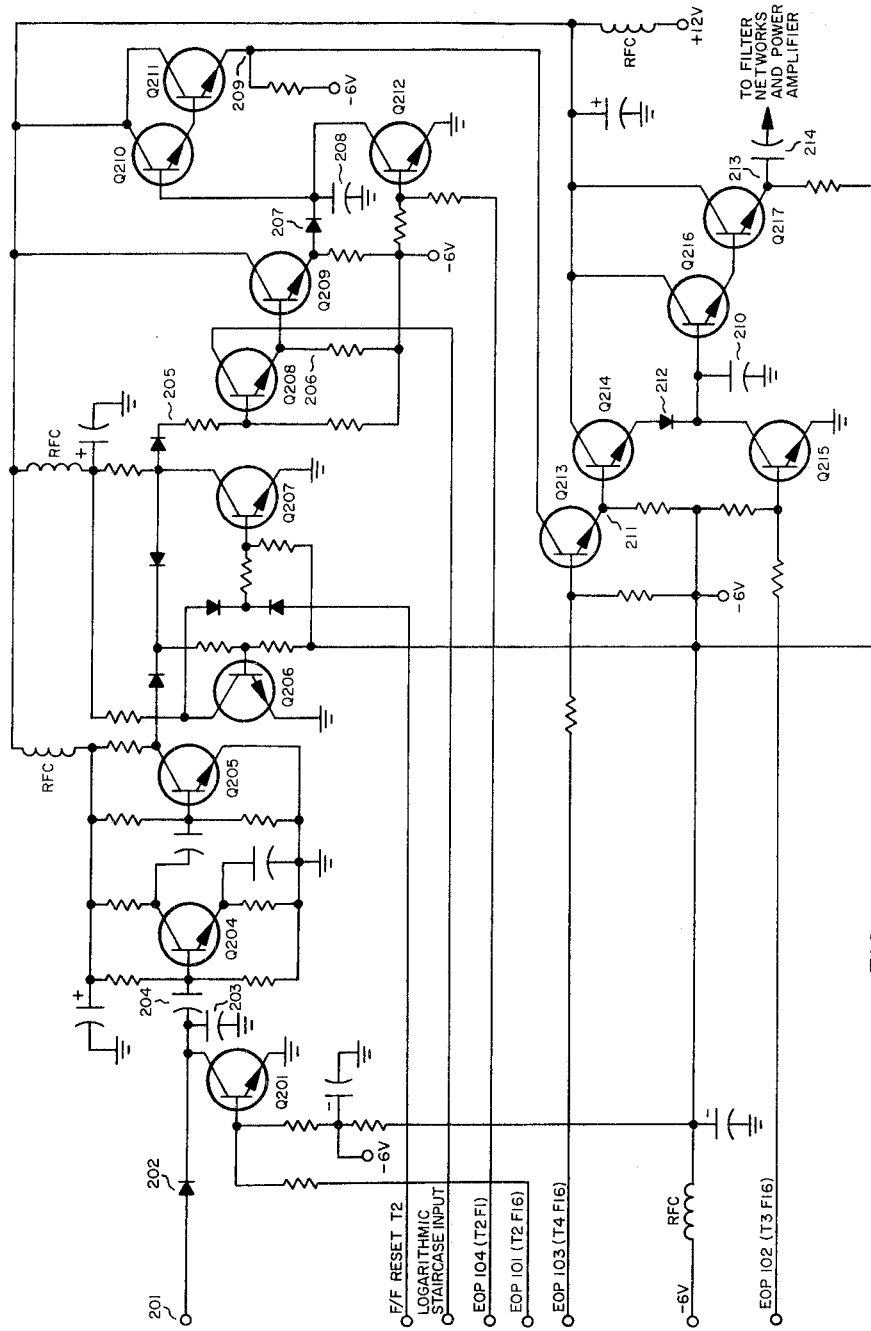
FIGURE 8 is a schematic diagram of the actual embodiment of our invention.

Before discussing in detail the schematic diagram of the actual working circuit shown in FIGURE 8, perhaps a discussion of the timing and control functions associated with the equipment is desirable, primarily to establish definitions of the different timing pulses. The timing and control circuits were already available in the parent TROPO equipment with which our invention was tested, and are not per se a part of this invention.

For a simplified nomenclature, the timing pulses are herein identified with special names. The sample frequency is the number of audio samples per second, and hence the sample period is defined as the time between audio samples.

In our embodiment a 7812.5 cps. sample frequency is used. The sample period is accordingly 128 microseconds. Our embodiment is not limited to this particular sample frequency, for it was chosen only to satisfy the Nyquist Sample Theorem. The sample period is divided into 16 equal sequential subdivisions called frames, of 8.00 microseconds each; see FIGURE 9. These are designated F1 through F16 respectively. Further, during the on-time of each Frame, six other sequential pulses called Time Slots occur. They are designated T1 through T6 respectively. Each slot is of 1.333 microseconds duration. The time control generator of the parent equipment used with our invention has 16 separate outputs for the separate Frames, and it has 6 separate outputs for the Time Slots.

Figure 9:
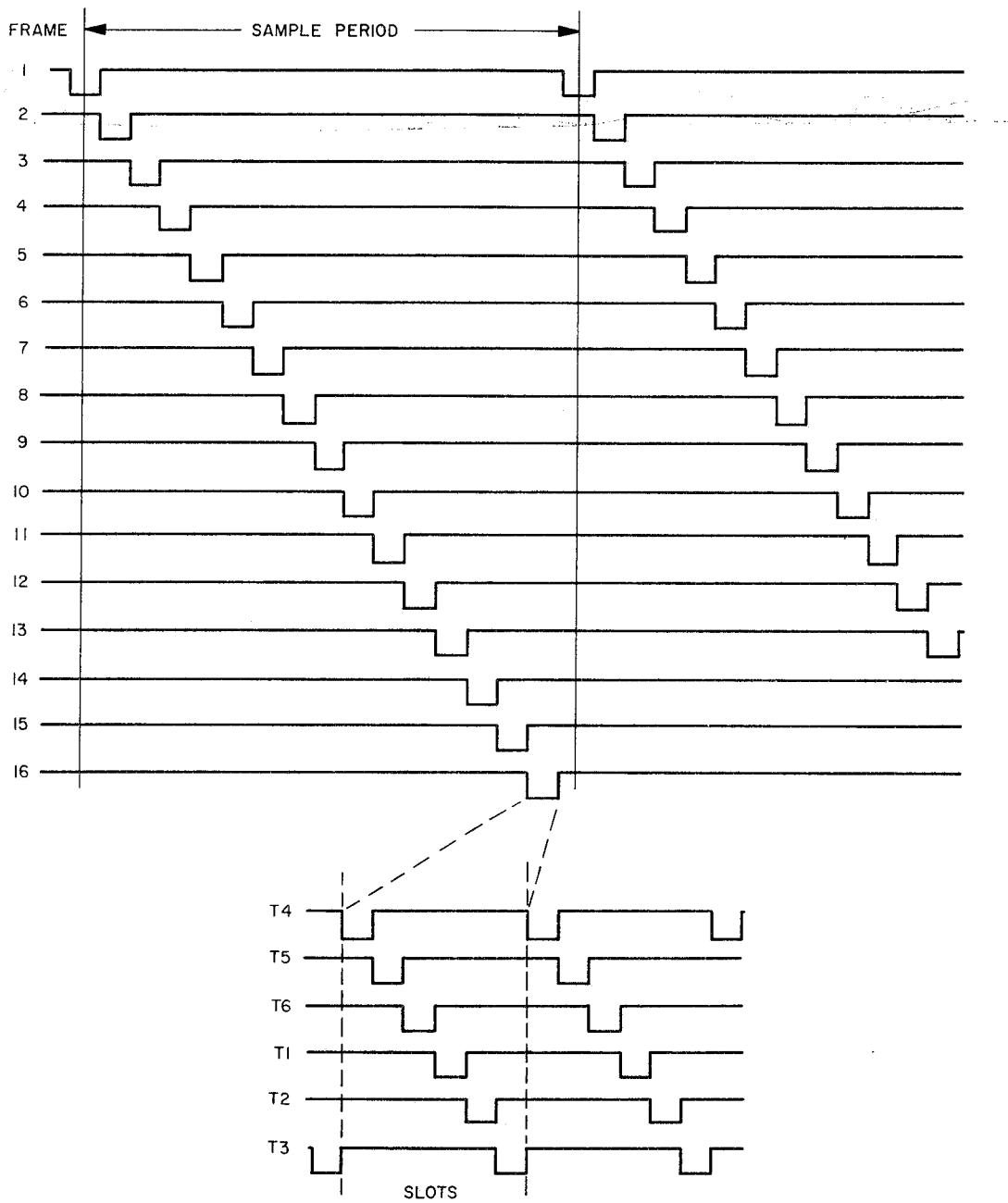
FIGURE 9 is a timing waveform used in conjunction with the explanation of our invention.

Referring to FIGURE 9 in greater detail, the occurrence of the Frames F1–F16 and the Time Slots T1–T6 are shown. Note that the Frames and the Time Slots are cyclic. A given Frame pulse occurs once per sample period. Likewise, a given time slot pulse occurs once during each Frame period.

The only pulses necessary for the operation of our invention are End of Period pulses $a$, $b$, and $c$, and Sample Control I, as was indicated in FIGURE 1. However, as will be apparent hereinafter, it was preferred in the embodiment of FIGURE 8 to employ four rather than three timing pulses as a result of the availability of a Time Control Generator having this type of output.

The nomenclature for a special pulse that might be made by an AND logic circuit with inputs of, say, Frame 16 and T3 is herein designated T3 F16, which means a positive pulse that occurs cyclically, but in F16 only, and then only during Time Slot 3. Note further, the designation of which slot is Time Slot 1 is arbitrary. For convenience, the Frames start at the same time as Time Slot 4 for this embodiment; note FIGURE 9.

Referring back to FIGURE 6, the waveforms used in this embodiment of our invention are shown. Waveforms S, T, U and V represent End of Period (EOP) 101, 102, 103 and 104 respectively. As will be seen, these are nomenclatured T2 F16, T3 F16, T4 F16 and T2 F1, respectively in FIGURE 8.

Turning now to related FIGURE 10, Line DD represents a continuous pulse train of T2 which is used to reset the Flip Flop 104 of FIGURE 5. Line EE of FIGURE 10 is a representation of Pulse Position Modulation plus noise which is gated during the time slot T6 of each successive frame. In accordance with our invention, the largest pulse of Line EE is to be detected and processed to produce a voltage analog of its position in the Sample Period N+1 as shown by line JJ. The box car-like waveform of line JJ represents the analog of the position of the largest pulse encountered (line EE) during the previous sample period. Line HH is the logarithmic staircase generated in accordance with this invention, whose voltage amplitudes are the reference voltage analogs of the 16 discrete time Frames of the sample period. Lines FF and JJ will be discussed in the detailed description of the circuit in FIGURE 8.

FIGURE 8 is the principal schematic diagram of the preferred embodiment of our invention. The Energy Sample Gate I called for in FIGURE 1 is not shown in FIGURE 8, for in our utilization the input signals (line EE FIG. 10) arrive at input 201 already gated during T6 and proceed through the diode 202, which is the Unilateral Device called for in 4, FIG. 1. Capacitor 203 stores a charge equal to the amplitude of the highest gated input signal, and represents the Energy Storage I FIG. 1. Each time a pulse higher than the previous high is received, the charge voltage of capacitor 203 is commensurately increased as shown by Line FF FIG. 10. In other words, the voltage across the capacitor 203 makes a positive step.

Capacitor 204 acts as a differentiator, such that a positive step across capacitor 203 results in a differentiated positive step at the input circuit of an amplifier consisting of Q204 and Q205; so that a positive step results in a positive pulse at the collector of the amplifier stage Q205. A positive pulse at the collector of Q205 causes the Flip Flop circuit Q206 and Q207 to be set. Since the signals are gated into the input 201 during T6, the positive steps can occur only during T6; and hence, the Flip Flop circuit Q206 and Q207 can be set only during T6. When the next T2 pulse occurs, the Flip Flop is reset. The output of the Flip Flop is thus shown by line GG FIGURE 10. The Flip Flop, which may be regarded as device 104 in FIGURE 5, in combination with the amplifier Q204 and Q205 and capacitor 204 forms the Positive Step Sensor 6 shown in FIGURE 1.

The output of the Flip Flop at 205 acts as a gate signal which in turn saturates gate transistor Q208 so that the Logarithmic Staircase voltage, Line HH FIGURE 10, appears at the emitter of Q208 for about 2 microseconds, until the next T2 resets the Flip Flop. Q209 is an emitter follower which, together with diode 207 transfers the staircase voltage to capacitor 208 everytime the Flip Flop Output at 205 is high.

Since the staircase of FIGURE 10, Line HH, continuously increases during each sample period, each time the gate Q208 switches, the voltage level stored by capacitor 208 increases to the then value of the nonlinear staircase. Thus Q208 and Q209 form the Energy Sample Gate II, of FIGURE 1, and Diode 207 with capacitor 208 forms the Energy Storage II of FIGURE 1.

Transistors Q210 and Q211 form a high input impedance emitter follower which desirably prevents discharge of capacitor 208 for the duration of the sample period.

Now, it is clear that the voltage at the output 209 of Q211 is equal to the voltage of the staircase at the last time a positive step is encountered in the charge on capacitor 203. This voltage, therefore, represents the position analog of the largest input pulse with respect to the beginning of the sample period. The problem now is to present this voltage to the output circuit. Line II, FIGURE 10 represents typical waveforms at point 209. Before the voltage at 209 can be gated through to capacitor 210, which is Energy Storage III of FIGURE 1, the voltage from the previous sample period must be discharged by the dump transistor Q215. The dump is accomplished by saturating Q215 with a positive pulse (AA FIGURE 10) T3 F16, which shorts out capacitor 210. Now the positive pulse T4 F16 transfers the voltage at 209 to capacitor 210 by saturating Q213 so that the voltage at 209 now appears at point 211, the base of emitter follower Q214 and through the diode 212 to charge capacitor 210. Transistors Q216 and Q217 are a high impedance emitter follower to prevent discharge of capacitor 210 during the next sample period. The output level, thus, appears at the output of said emitter follower Q217 at 213, whereby capacitor 214 is used to couple the audio components of the boxcar wave to conventional filter networks from which the audio signal can be recovered.

Referring back to FIGURE 6, which is related to FIGURE 7, it will now be explained with reference to these figures how the circuit of FIGURE 8 is prepared for each successive sample period.

The pulse T2 F16 (EOP 101, shown in line S, FIGURE 6), is used to dump capacitor 203 of FIGURE 8 by saturating transistor Q201 of latter figure. The boxcar circuit capacitor 210 of FIGURE 8 is dumped to prepare for the imminent new sample by the pulse T3 F16, (EOP 102, Line T FIGURE 6) by saturating Q215 of FIGURE 8. The new sample is then gated from the Buffer Storage capacitor 208 (FIGURE 8) into the boxcar by the action of T4 F16 (EOP 103, Line U FIGURE 6) by saturating Q213 FIGURE 8. Lastly, the buffer storage capacitor is dumped by T2 F1 (EOP 104, Line V FIGURE 6) by saturating Q212. The circuit is now ready for the new sample period to begin.

Figure 11A:
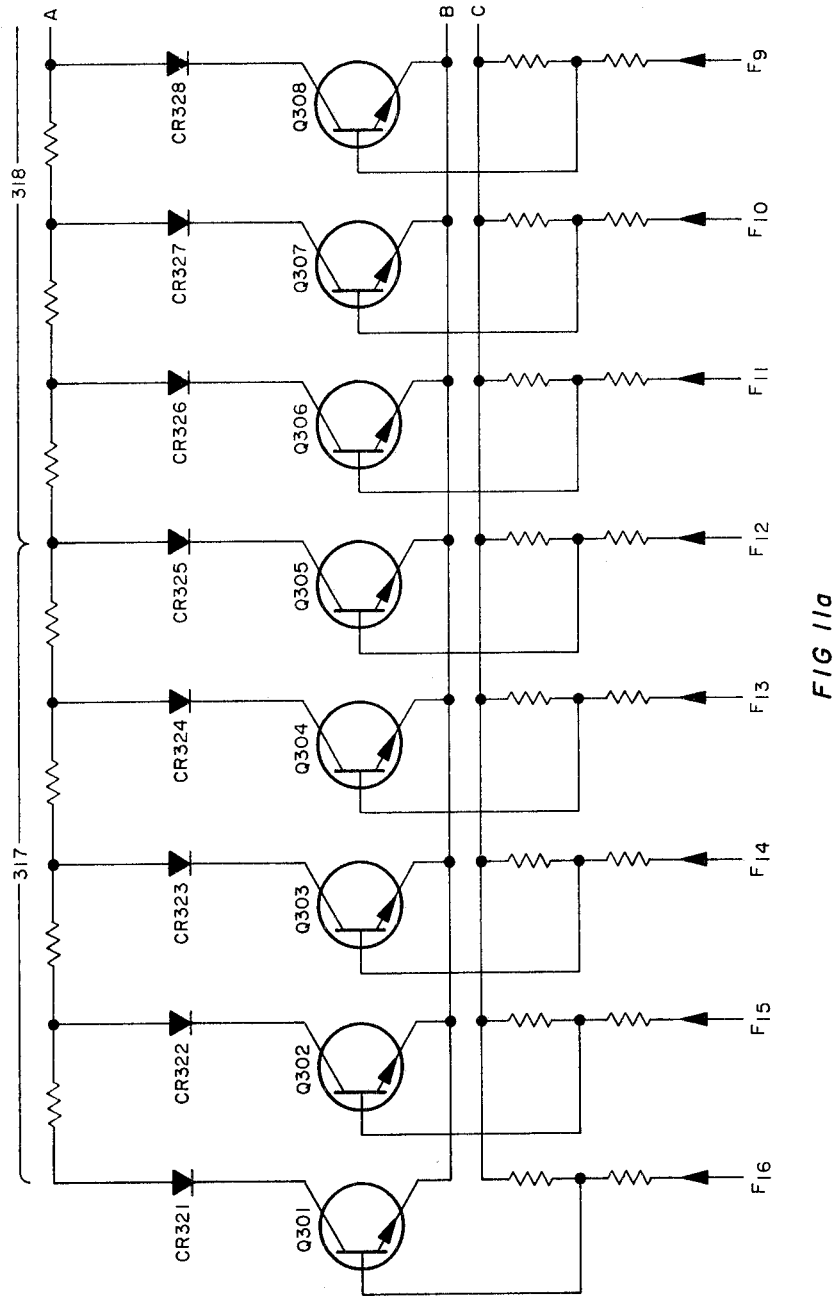

The method of generating the logarithmic (nonlinear) staircase is shown schematically in related FIGURES 11a and 11b, wherein it is understood that the positive-going version of the pulses of FIGURE 9 is used instead of the negative-going pulses shown. The operation of the circuit is as follows: Each of the transistor switches Q301 through Q316 is closed in sequence by the Sequential Pulse Inputs consisting of $-F_1$ through $-F_{16}$ from the Timing Control Generator of the parent equipment. When each transistor switch closes in turn, a voltage division circuit is allowed to reach a predetermined division determined by the resistor banks shown at the top of the circuit. For example, during Frame 12, Q305 is saturated. The voltages at point 320 become the simple voltage division of the combination of series banks of resistors 317, 318 and resistors 319 and 321. For precision, the forward drops of diodes CR321 through CR336 must be included in calculations. CR337 is a Zener reference diode for producing a precision supply voltage.

The use of diodes CR321 through CR336 permits the use of a number of different diode matrices operating from the same switches Q301 through Q316. The other diode matrices can produce phase displaced waveforms as well as other waveforms for different channel banks.

Circuits for Energy Storage II and III are available that do not require dumping, thus removing the necessity of generating these timing pulses. The inclusion, however, of these circuits in place of the original circuits does not change the general spirit of the invention, as the function of the storage circuits is the same. Further, the inclusion of these circuits removes the requirement for the reference waveform to always be increasing during the sample period. Though the general spirit of the invention has not changed, the reference waveform can now be changed into a cryptographic waveform of any shape of voltage versus time for the purpose of secure cryptographic communications.

The embodiment of FIGURE 5 used conventional Boxcar circuits for the functions of Storage II and III because they are economical and the dumping pulses were readily available from the timing control unit. However, Sampler circuits as illustrated in FIGURE 12 and shown schematically in FIGURE 13 can be used for the storage functions II and III without the need of dump pulses.

Figure 12:
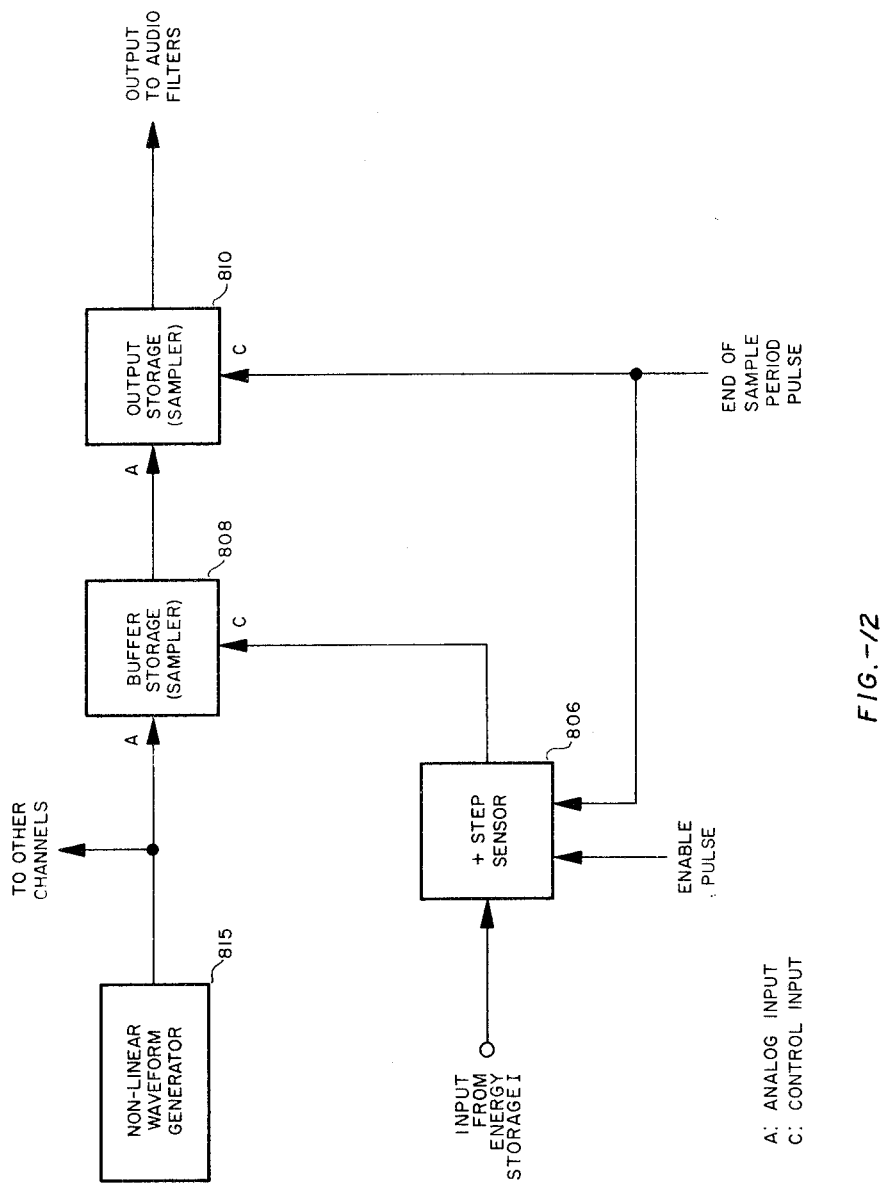
FIGURE 12 is a block diagram of a simplified version of our invention.

Referring to FIGURE 12, the input from Energy Storage I (FIGURE 1) impinges on the plus step sensor 806 which issues a pulse each time an additional charge is placed in the Energy Storage I (FIGURE 1). The output causes the Buffer Storage 808, which is equivalent to Energy Storage II (FIGURE 1) to assume and store the then instantaneous voltage of the Nonlinear Waveform Generator 815. Advantageously, the nature of the circuit is such that the storage element 808 either charges or discharges to the value of the reference waveform everytime the plus step sensor issues an output. Since as before, the last pulse output from the Plus Step Sensor 806 corresponds to the position of the most likely correct pulse, the voltage then gated into Buffer Storage 808 is the voltage analog of that position. At the end of the sample period, the Output Storage 810 receives a sample pulse which causes the storage element to assume the same voltage that was last placed in buffer storage 808.

Figure 13:
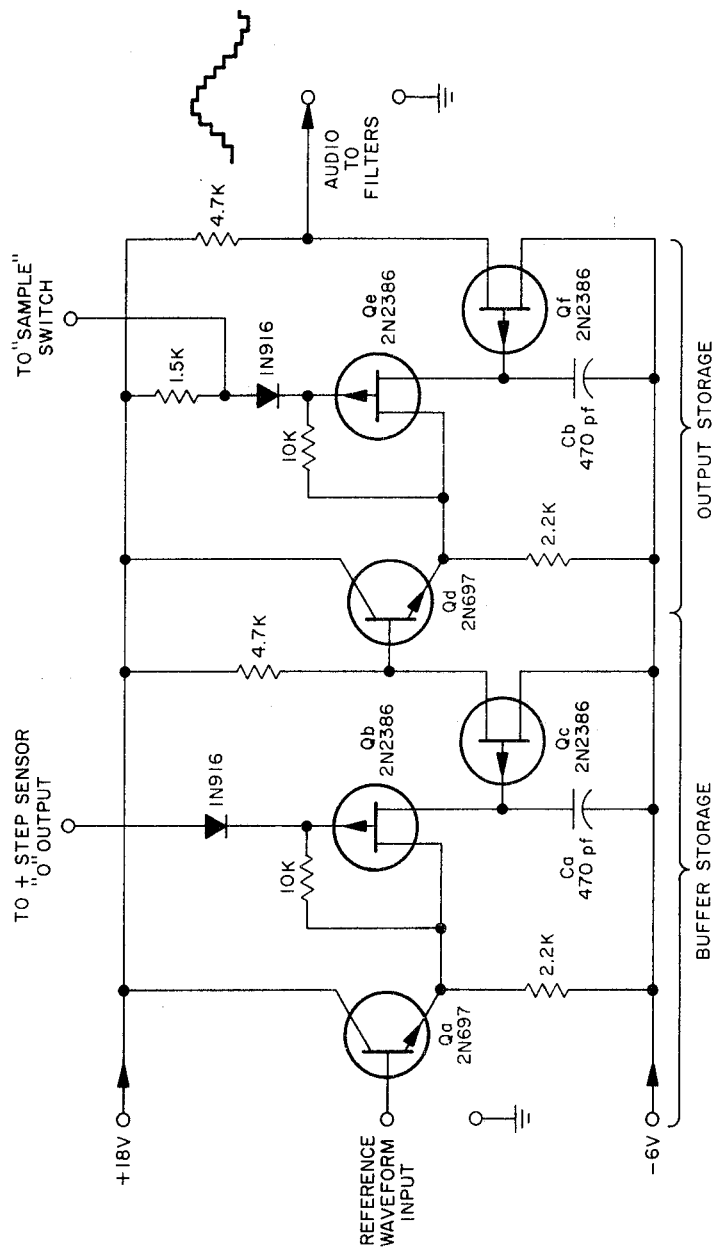
FIGURE 13 is a schematic diagram associated with FIGURE 12.

The circuit is clearly understood by referring to the schematic FIGURE 13. The reference waveform enters the base of Qa which is an emitter follower of low output impedance. Qb is a field effect transistor which is used as a bilateral switch. A commutating transistor can also be used here with same result. When the plus step sensor places a ground at its input, Qb loses its bias and becomes a low impedance bilateral switch. The capacitor, Ca, then either charges or discharges to the value of the reference waveform as it appears at the emitter of Oa. Field effect transistor Qc is used as a very high impedance to couple the voltage of Ca into the Output Storage circuit consisting of transistors Qd, Qe and Qf. Circuit operation of the output storage is the same as the operation of the buffer storage section which has already been described. At the very end of every sample period the output storage circuit copies the voltage in buffer storage and holds that value until the end of the next sample period.

In connection with FIGURES 12 and 13, it should be noted that although we have described this embodiment to utilize a nonlinear waveform generator, we may prefer instead to utilize a cyclic, random-like staircase waveform for the purpose of demodulating pulse position modulated pulses that have been correspondingly quantized at the transmitter.

This feature is possible with this latter embodiment by virtue of the inclusion of bilateral switches $Qb$ and $Qe$ in FIGURE 13, instead of the unilateral gating used in our earlier-described embodiment, which required a continuously increasing timing wave. Thus, in the latter embodiment the reference timing wave may make increasing or decreasing excursions in any combination during a sample period, which may be referred to as a cyclic, random-like staircase timing wave.

As will now be apparent, we have provided a novel, highly advantageous demodulator-expander for use in single channel or multichannel pulse type communication systems. A multichannel system can share the same staircase wave whether linear or nonlinear, thus saving the costs of requiring a separate generator for each channel. This feature is of course accomplished by our novel "store and transfer" technique set forth herein.

It should be noted that the invention is not limited in its scope to quantized methods of modulation, nor manifestly in its applicable to analog modulation techniques as well, such as simple PPM.

Also, the invention lends itself to the use of a cyclic, random-like reference timing wave, as may be applicable for crypto techniques.

We claim:

1. A demodulator for extracting the intelligence from a stream of pulses that have been position modulated, comprising a storage device for receiving and storing successively each position modulated pulse whenever such pulse arrives, means for measuring the time of arrival of each pulse with respect to a time reference, said means for measuring said time of arrival producing a voltage amplitude nonlinearly proportional to the relative time of arrival of said position modulated pulse, means for retaining said voltage amplitude until the end of each reference time period, and means for reading out such voltage amplitude at the end of each reference time period.

2. A demodulator which extracts the intelligence from a stream of pulses that have been position modulated comprising a storage device for receiving a position modulated pulse whenever such pulse arrives during a modulation time period, said storage device being empty at the beginning of such a modulation time period, a timing device for measuring the time of arrival of said pulse with respect to a reference based upon the time period, said measurement being in the form of a voltage amplitude nonlinearly proportional to the relative time of arrival of said position modulated pulse, means for retaining said voltage amplitude until the end of such time period, and means for emptying said storage device at the end of such time period.

3. A demodulator for extracting the intelligence from a stream of pulses that have been position modulated, comprising means for receiving and storing analogs of each successively larger position modulated pulses, means including timing means for establishing the time of arrival of each of such pulses with respect to pre-established reference periods by generating a nonlinear timing wave, said timing means establishing such time of arrival by being arranged to store a reference value of such non-linear timing wave in response to each pulse of each reference period that is larger than any preceding pulse of the same period, said means for receiving and storing serving to retain each reference value until the end of each reference period, and means for gating out at the end of each reference period, a voltage representing the amplitude of the last stored reference value of the timing wave of said timing means at the end of each reference period, said amplitude being nonlinearly proportional to the time of arrival of the largest pulse in each period.

4. The demodulator as defined in claim 3 including storage means for receiving the voltage outputs of successive equal reference periods so as to reproduce, by a succession of such voltage levels, the transmitted intelligence contained in the position modulated pulses.

5. The demodulator as defined in claim 4 in which means are provided for emptying at the end of each reference period, both the means for receiving position modulated pulses and the voltage outputs of successive reference periods preparatory to receiving the pulses and voltage outputs representative of subsequent reference periods.

6. The demodulator as defined in claim 3 wherein said timing means for establishing the time of arrival of each pulse with respect to pre-established reference period stores the values of a nonlinearly increasing timing wave, and means for producing a continuum of output voltage values from said stored values of the timing wave for reproduction of continuous pulse position modulated signals.

7. The demodulator as defined in claim 3 wherein said timing means for establishing the time of arrival of each pulse with respect to pre-established reference period generates a nonlinearly increasing timing wave, and means for producing by means of said timing wave a continuum of output voltage values containing the discrete voltages required for reproduction of pulse position modulation signals.

8. The demodulator as defined in claim 3 wherein said timing means for establishing the time of arrival of each pulse with respect to pre-established reference period generates a nonlinear staircase waveform with an integral number of discrete non-uniform voltage steps during each said reference time period, and means for producing by means of said timing wave an integral number of discrete output voltage steps for reproduction of quantized pulse position modulated signals.

9. The demodulator as defined in claim 4 wherein said timing means for establishing the time of arrival of each pulse with respect to pre-established reference period generates a nonlinear staircase waveform with an integral number of discrete nonuniform voltage steps during each said reference time period, and means for producing by means of said timing wave an integral number of discrete output voltage steps for reproduction of continuous pulse position modulated signals where such reproduction is required to be quantized in amplitude.

10. The demodulator as defined in claim 3 in which said demodulator is one of a plurality of demodulators used in a multichannel communication system, a nonlinear waveform generator common to said plurality of demodulators, for providing the demodulation reference timing wave for said demodulators.

11. In a pulse signalling system using pulse position modulation, said system having noise and interfering crosstalk pulses associated with said pulse signalling systems where such noise and interfering crosstalk pulses contain less energy than the correct pulse, said system comprising a unilateral device and energy storage means for accepting and storing the first pulse arriving during a given time period, latter means accepting and storing each pulse subsequently arriving during said given time period that has a higher probability, by virtue of a higher amplitude, of being the correct pulse than other pulses arriving earlier in the time period, said means also disregarding such previously accepted and stored pulses arriving during the time period, said means also rejecting false pulses arriving in the time period subsequent to the arrival of the correct pulse, means for determining the time of arrival of said correct pulse with reference to the beginning of the time period, means for converting said time of arrival to a voltage amplitude that is nonlinearly proportional to said time of arrival of said correct pulse, means for storing said output voltage amplitudes for a succession of time periods, means for reading out the sequence of stored voltages whose amplitudes are nonlinearly proportional to the time of arrival of the correct pulses in each succeeding time period, said sequence of output voltages being an expanded sampled reproduction of the original signal, free from noise and distortion due to noise signalling systems, and means for discharging the input and output storage at the end of each time period.

12. The pulse signalling system as defined in claim 11 in which said means for determining the time of arrival of said correct pulse with reference to the beginning of a time period generates a nonlinearly increasing timing wave, said timing wave being initiated at the beginning of the sample period, the voltage of said timing wave being buffer stored as each successive acceptance and storage of a pulse occurs, thus achieving an amplitude at the end of a complete time period nonlinearly proportional to the time of arrival of the last and most probably correct pulse, and means for utilizing the buffer stored values of said timing wave to produce a continuum of output voltage values for reproduction of continuous pulse position modulated signals and quantized pulse position modulated signals.

13. The pulse signalling system as defined in claim 11 in which said means for determining the time of arrival of said correct pulse with reference to the beginning of a time period generates a nonlinear staircase waveform timing wave, said timing wave being initiated at the beginning of the sample period, the voltage of said timing wave being buffer stored as each successive acceptance and storage of a pulse occurs, thus achieving an amplitude at the end of a complete time period nonlinearly proportional to the time of arrival of the last and most probably correct pulse, and means for utilizing said buffer stored timing wave to produce over a number of time periods an integral number of discrete output voltage steps for reproduction of quantized pulse position modulation signals and for reproduction of continuous pulse position modulated signals where such reproduction is required to be quantized in amplitude.

14. The pulse signalling system as defined in claim 11 in which said means for determining the time of arrival of said correct pulse with reference to the beginning of a time period generates a cyclic, random-like staircase timing wave, said timing wave being initiated at the beginning of the sample period, the voltage of said timing wave being buffer stored as each successive acceptance and storage of a pulse occurs, thus achieving an amplitude at the end of a complete time period nonlinearly proportional to the time of arrival of the last and most probably correct pulse, and means for utilizing said buffer stored timing wave to produce over a number of time periods an integral number of discrete output voltage steps for the reproduction of correspondingly quantized pulse position modulation signals.

15. The pulse signalling system as defined in claim 11 in which a plurality of communication channels are utilized, with said means for determining said time of arrival of the correct pulses in each channel utilizing a nonlinear waveform generator that is common to each of said channels.

16. A demodulator arrangement for extracting the intelligence from a stream of position modulated pulses occurring in each of a plurality of channels of a communication system, said demodulator arrangement comprising a plurality of demodulators, one in each of the plurality of channels, each of said demodulators having a storage device for receiving and storing successively each position modulated pulse whenever such pulses arrive, said demodulators also each having means for measuring the time of arrival of each pulse with respect to a time reference, said means for measuring said time of arrival producing a voltage amplitude nonlinearly proportional to the relative time of arrival of said position modulated pulse, and means for storing and then reading out such voltage amplitude at the end of each reference time period, said demodulator arrangement also including a nonlinear waveform generator common to each of said plurality of demodulators, for providing said nonlinearly proportional voltage amplitude.

References Cited

UNITED STATES PATENTS

| | | | |
|---|---|---|---|
| 2,902,542 | 9/1959 | Treadwell | 328—151 X |
| 3,120,647 | 2/1964 | Bravenec | 328—145 X |
| 3,212,014 | 10/1965 | Wiggins et al. | 329—107 |
| 3,219,994 | 11/1965 | James | 328—145 X |

ALFRED L. BRODY, Primary Examiner

U.S. Cl. X.R.

179—15; 307—232, 269, 271; 325—324; 328—109, 145, 151